United States Patent
Woo

(10) Patent No.: US 7,042,434 B2
(45) Date of Patent: May 9, 2006

(54) LAMP DRIVE APPARATUS AND DRIVE METHOD OF A NOTEBOOK COMPUTER

(75) Inventor: Jong Hyun Woo, Pyungtaek-si (KR)

(73) Assignee: LG Electronics Inc., Seoul (KR)

( * ) Notice: Subject to any disclaimer, the term of this patent is extended or adjusted under 35 U.S.C. 154(b) by 423 days.

(21) Appl. No.: 10/194,068

(22) Filed: Jul. 15, 2002

(65) Prior Publication Data

US 2003/0043106 A1  Mar. 6, 2003

(30) Foreign Application Priority Data

Aug. 30, 2001 (KR) .................................. 01-53027

(51) Int. Cl.
G09G 3/36 (2006.01)

(52) U.S. Cl. ...................... 345/101; 345/102; 315/158; 315/309

(58) Field of Classification Search ................ 345/101, 345/102, 204–215, 87–100; 315/157–158, 315/309
See application file for complete search history.

(56) References Cited

U.S. PATENT DOCUMENTS

| 4,659,183 A | * | 4/1987 | Suzawa ........................ 349/67 |
| 5,907,222 A | * | 5/1999 | Lengyel et al. ............. 315/158 |
| 6,388,388 B1 | * | 5/2002 | Weindorf et al. ......... 315/169.3 |
| 6,636,190 B1 | * | 10/2003 | Hirakata et al. ........... 345/74.1 |

FOREIGN PATENT DOCUMENTS

| JP | 10148808 A | * | 6/1998 |
| JP | 10-203715 |   | 7/1998 |

* cited by examiner

Primary Examiner—Amr A. Awad
(74) Attorney, Agent, or Firm—Fleshner & Kim, LLP

(57) ABSTRACT

This present invention relates to a lamp drive apparatus and a drive method for an LCD equipped portable electronics to maintain a user-selected level of brightness in accordance with surrounding temperature of the lamp. In one operation mode a lamp drive apparatus reduces the current, which is applied into the lamp to maintain the already selected level of brightness in accordance with a detected lamp surrounding temperature where the brightness of the lamp has already been set in the LCD, to make the LCD device to illuminate no brighter than the selected level of brightness. Accordingly, the battery power can be used more efficiently or effectively. Thus, the battery life can be extended.

13 Claims, 3 Drawing Sheets

Stored Information in ROM (31)

Figures 1, 3:
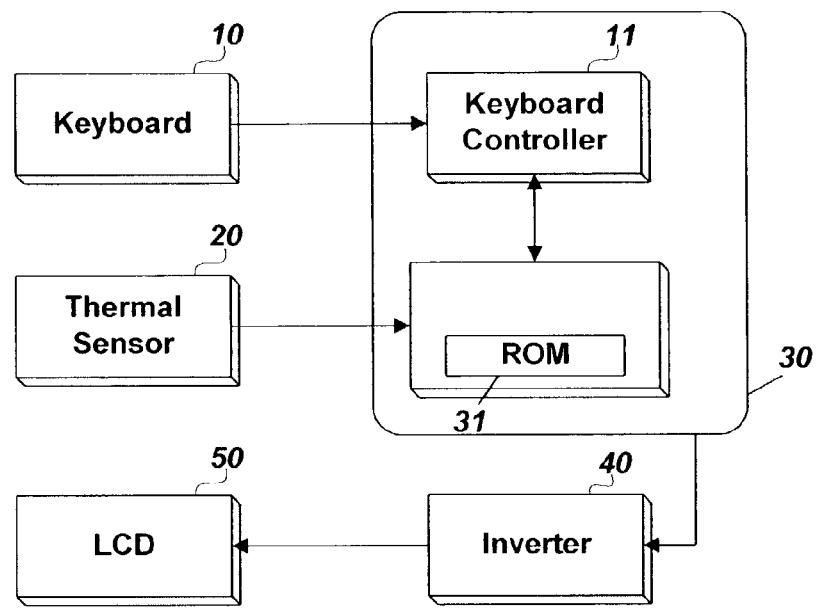

| Brightness Control Information (Brightness Level) | Lamp Drive Current | Brightness (at 25°C) |
|---|---|---|
| Level 1 (0V) | 1mA | 50cd/m$^2$(Nit) |
| Level 2 (0.5V) | 1.5mA | 60Nit |
| Level 3 (1V) | 2mA | 70Nit |
| Level 4 (1.5V) | 2.5mA | 80Nit |
| ⋮ | ⋮ | ⋮ |
| Level 8 (3.5V) | 4.5mA | 120Nit |
| Level 9 (4V) | 5mA | 130Nit |
| Level 10 (4.5V) | 5.5mA | 140Nit |
| Level 11 (5V) | 6mA | 150Nit |

FIG. 4

*Stored Information in ROM*
(31)

| Brightness Control Information (Brightness Level) | Lamp Drive Current | Brightness (at 27°C) |
|---|---|---|
| Level 1 (0V) | 1mA | 60cd/m$^2$(Nit) |
| Level 2 (0.5V) | 1.5mA | 70Nit |
| Level 3 (1V) | 2mA | 80Nit |
| Level 4 (1.5V) | 2.5mA | 90Nit |
| ⋮ | ⋮ | ⋮ |
| Level 8 (3.5V) | 4.5mA | 130Nit |
| Level 9 (4V) | 5mA | 140Nit |
| Level 10 (4.5V) | 5.5mA | 150Nit |
| Level 11 (5V) | 6mA | 160Nit |

FIG. 5

*Stored Information in ROM*
(31)

| Brightness Control Information (Brightness Level) | Lamp Drive Current | Brightness (at 29°C) |
|---|---|---|
| Level 1 (0V) | 1mA | 70cd/m$^2$(Nit) |
| Level 2 (0.5V) | 1.5mA | 80Nit |
| Level 3 (1V) | 2mA | 90Nit |
| Level 4 (1.5V) | 2.5mA | 100Nit |
| ⋮ | ⋮ | ⋮ |
| Level 8 (3.5V) | 4.5mA | 140Nit |
| Level 9 (4V) | 5mA | 150Nit |
| Level 10 (4.5V) | 5.5mA | 160Nit |
| Level 11 (5V) | 6mA | 170Nit |

LAMP DRIVE APPARATUS AND DRIVE METHOD OF A NOTEBOOK COMPUTER

FIELD OF THE INVENTION

The present invention relates to a system for analysing textual data. In particular, the analysis results in revealing information hidden in textual data. Such a system can be used in a method for developing consumer products, or for better targeting the marketing consumer products, when the textual data that is to be analysed is obtained from consumers.

BACKGROUND OF THE INVENTION

Developing and marketing new (consumer) goods, and in particular goods in the fast moving consumer goods area, involves in many cases at some stage obtaining information from consumers as to what sort of products they want, and/or obtaining information from consumers to effectively target marketing and sales, and/or research during the product development process, and/or monitoring the consumer appraisal once the product is/has been evaluated before or after being launched. Gathering such information can be done in many different ways, e.g. by interviewing individuals or groups of consumers, feedback after purchase, spontaneous email (e.g. from consumers to care-lines of product websites), questionnaires call for free-text answers, et cetera. Usually such information is obtained in a textual format or can be translated into that.

Whether the information appears directly expressed or implicit in the text, it may be desired to perform some analysis or information extraction and/or interpretation to obtain this information. Existing examples of information extraction from factual documents (e.g. reports, scientific prose, news feeds, legal texts, etc.) are based on the recognition of entities and events. In order to fill pre-defined templates, the linguistic elements which represent the entities need recognising, the syntactic-structures in which the entities are embedded need disentangling, and the nature of the semantic links between entities need interpreting.

Although in principle similar information extraction techniques could be attempted with unstructured subjective textual data, the infinite multiplicity of the modes of expression used by individuals on subjects such as personal issues, opinions, beliefs and habits does not make these methods wholly appropriate and does not give satisfactory results. Examples of subjective or unstructured text are literature, free-text questionnaire answers, interviews and loosely-directed monologues, focus-groups interactions, spontaneous communications, etc. The information which is to be revealed are not events or entities, but rather qualifiers, concepts, opinions, etc. as well as the characteristics of a specific linguistic expression.

There are also techniques known for analysing textual data which can be grouped under the header linguistic analysis techniques. Examples of such techniques are extraction of linguistic units or linguistic features from textual chains, analysis of lexical semantic patterns, analysis of collocations and coherent groups, analysis of co-occurrences and conceptual chains, analysis of affect, and others. Such techniques are discussed in:

Atkins, B.T.S. & Zampolli, A. (eds) (1994). Computational approaches to the lexicon. Oxford: Oxford University Press.

Firth, J.R. (1951). Modes of meaning (Essays and Studies). In J.R. Firth: Papers in Linguistics, 190–215, London: Oxford University Press.

Ghiglione, R., Landré, A., Bromberg, M., Molette, P. (1998). L'analyse automatique des contenus. Paris: Dunod.

Lebart L., Salem A., Berry L. (1998). Exploring textual data. Dordrecht: Kluwer Academic Publishers.

Marchand, P. (1998). L'analyse du discours assistée par ordinateur. Concepts, méthodes, outils. Paris: Armand Colin (U).

Roberts, C.W. (1997). Text analysis for the social sciences: methods for drawing statistical interferences from texts and transcripts. Lawrence Erlbaum Assoc. Publishers, Mahwah, N.J.

Sinclair, J.M. (1991). Corpus, concordance, collocation. Oxford: Oxford University Press.

Whissell, C., Fournier, M., Pelland, R., Weir, D. & Makarec, K. (1986). A dictionary of affect in language: IV. Reliability, validity, and applications. Perceptual and Motor Skills.

While such information extraction or linguistic analysis techniques may provide valuable information, there is more information which is hidden in textual data which is not revealed by these methods.

A wide variety of statistical methods are available for extracting information from numerical data. Such statistical methods can be anything from simple counting to more advanced statistical techniques, e.g. dimension reduction, clustering, hypothesis testing, model fitting, correlation and others. Various such statistical techniques are described in:

Dimension reduction: Krzanowski W.J. & Marriot F.H.C. (1994) Multivariate Analysis—Edward Arnold.

Clustering: Everitt B.S. (1993) Cluster Analysis—Edward Arnold.

Hypothesis testing: Altman D.G. (1991) Practical Statistics for Medical Research—Chapman & Hall.

Model fitting: e.g. Draper N.R. & Smith H. Applied Regression Analysis—Wiley (1998)

Correlation: The Cambridge Dictionary of Statistics (1998), Everitt B.S.—Cambridge University Press.

Time Series: The Analysis of Time Series: An Introduction. Chatfield C. (1996).

While such statistical methods may provide information from numerical data, they are not directly applicable to textual data.

New profiling and segmentations of the consumer population are being sought, which are no longer based on demographics but on new drivers like life style, educational attainment, attitudes to the environment, health issues, social preferences, etc.

SUMMARY OF THE INVENTION

Hence, there was a need for a tool or system that can be used to analyse unstructured, subjective or personal text.

It has now been found that the above may be achieved (at least in part) by a system for revealing information by subjecting textual data to:

a) a module for entering textual data b) a module (A) for linguistic analysis for analysing said data, c) a module (B) for statistical analysis of the results of module (A).

Preferably the system of the invention is an electronic system for example a computer system In this, the statistical analysis is understood not to relate just to simple counting and calculating averages and percentages. It will be clear to the person of average skill what statistical analysis is and what is to be understood as linguistic analysis. There are also examples of linguistic analysis tools that have some basic statistical analysis incorporated therein, and some statistical tools which have a minimum of linguistic analysis embedded in them. For example, word frequency counts which define a word as a string of characters comprised between two successive spaces (system with minimal linguistic analysis); for example, customised text editors which manage manually-defined labels indexing the semantic contents of portions of documents and return findings on the relative importance of certain themes across a number of texts (system with minimal statistical analysis). For the purpose of this invention, these will still be called linguistic tools, and statistical tools, respectively, i.e. independent of the presence of a bit of the other technique in them.

RU 2107950 XP 002181209 (Epodoc) discloses the use of acoustic and linguistic analysis and statistic criteria for decision making. This document does not indicate the advantages of first applying a linguistic analysis and subsequently applying a statistical analysis on the results thereof.

DETAILED DESCRIPTION OF THE INVENTION

It has now been found that statistical analyses may be performed on data that is obtained from a preceding linguistic analysis of textual data, and that such a combination of techniques yields information from unstructured, subjective or personal texts not available so far.

In order to practice this invention it is preferred if such techniques are present as modules in a system, especially because there is a wide range of both linguistic and statistical techniques to choose from. Of course, such a system will contain some form of module to enter the textual data to be analysed. A system according to the invention may also comprise a module to present the output, but it may also be possible that the module that provides the statistical analysis provides the output itself.

In the system according to the invention, the linguistic analysis is preferably achieved by subjecting the textual data to one or more of:

a) extraction of linguistic units or linguistic features from textual chains
b) removal of stop-words [list re-ordered]
c) analysis of lexical semantic patterns
d) analysis of collocations and coherent groups
e) analysis of co-occurrences and conceptual chains
f) analysis of lexical complexity, co-reference
g) analysis of affect
h) tagging units in the textual chain yields: Part-Of-Speech tags, semantic descriptors, other indexing tags, syntactic tagging, functional tagging
i) analysis of syntactic complexity If one or more of the techniques c) to i) is chosen, it is preferably applied after a preliminary extraction of linguistic units or linguistic features from textual chains (a) and/or the removal of stop words (b). The extraction of linguistic units or linguistic features is preferably done in such as way that it yields one or more of:

A1 letters
A2 morphemes
A2' free morphemes
A2" bound morphemes
A3 words (e.g. simple, compound), lemmas & word classes (POS)
  A3' nouns (e.g. common nouns, proper names)
  A3" verbs (including auxiliaries)
  A3'" adjectives
  A3'4 determiners (e.g. articles, possessive adjectives, demonstrative adjectives, exclamative adjectives, quantifiers and numerals)
  A3'5 pronouns and pro-forms
  A3'6 adverbs (e.g. adjuncts and subjuncts, disjuncts, connectors)
  A3'7 exclamations and interjections
  A3'8 prepositions
  A3'9 conjunctions
A4 phrases and idioms (e.g. noun phrases, verb phrases, adjectival phrases, prepositional phrases, adverbial phrases)
A5 clauses (e.g. relative clauses, nominal clauses, adverbial clauses, independent, comment clauses)
A6 sentences
A7 paragraphs
A8 discourse structures, rhetorical structures
A9 functions (e.g. subject, object, complement, adverbial)
A10 semantic patterns (e.g. Key Words In Context's), collocations, co-occurrences, semantic fields, semantic networks, semantic components)
A11 lexical patterns, lexical complexity, co-reference
A12 syntactic patterns, syntactic complexity.

In the system according to the invention the statistical analysis is preferably achieved by subjecting the results of module (A) to one or more of:

Dimension reduction
Clustering
Hypothesis testing
Model fitting
Correlation

These statistical techniques are known as such.

It has been found that it may be preferred to analyse texts by a combination of techniques according to the invention in which the linguistic analysis is the extraction of linguistic units or linguistic features and the statistical analysis is dimension reduction. Alternatively, it may be preferred to combine the extraction of linguistic units or linguistic features (as linguistic analysis) with clustering as statistical analysis. Another preferred combination is wherein the linguistic analysis is the analysis of co-occurrences and collocations and the statistical analysis in hypothesis testing.

The system according to the present invention is in particular suitable for textual data which are captured from one or more of:

a) interviews
b) focus groups
c) syndicate groups
d) questionnaires (free text)
e) computer mediated communication (e.g. chat room conversations, email, computer conferencing)
f) telephone conversations
g) video conferences
h) audio and audiovisual broadcasts
i) encoded language (e.g. morse) as well as published or unpublished print or electronic media, including:
j) newspapers
k) books
l) magazines
m) electronically published media
n) naturally occurring conversations
o) mixtures of the above Although the origin of the text may be anything as set out above (and even other), the physical format of such textual data to be analysed is one or more of:
 a) transcripts of speech
 b) electronic text
 c) printed or handwritten media
 d) transliterations.

The system according to the invention may have any suitable physical form. Given the amount of information to be processed the module for entering textual data preferably comprises means for getting the textual data into an electronically readable format and has optionally further one or more of the following functionalities: concatenating or splitting files by respondent or by question, creating tagged or lemmatised sentences, all manner of string/line/tagged sequences searching and replacement, multi-criteria retrieval. The information may be stored using electronic storage means, e.g. in the form of databases, computer readable data carriers or other.

The system according to the present invention may further contain a module for linguistic post processing after module (B). In that case, such linguistic post-processing comprises preferably one or more of
 the grouping of concepts,
 the averaging out of semantic values,
 the building of word nets from results.

The output, either with or without linguistic post processing, may be generated in any suitable form. Examples are graphs, tables, lists, computer-screen projections, networks, webs, trees, dynamic lay out graphs, hard copies thereof.

As set out herein before, the invention provides a system for analysing textual data. Although analysing single sets of textual data can be desired for some purposes, it may provide further insight in information if two or more different sets of textual data are analysed using a system according to the present invention and the two or more outputs may subsequently be compared. Likewise, it may be preferred to compare the revealed information obtained using a system according to the invention with existing numerical or textual data. For example, when using the system according to the invention for improving the development of consumer products, such existing numerical or textual data may comprise or relate to one or more of physical and/or chemical properties of products and/or packaging, physical measurements, demographic information, quantitative questionnaire results, sensory panel results, consumer behaviour, time/date information.

Although the system according to the present invention may be used for analysing existing textual data, the system can also be adapted such that the textual data to be analysed are captured and analysed in real time. For specific purposes, it may also be preferred to feed back the obtained output using the system according to the invention to the individuals who produced the original textual data.

EXAMPLES

Example 1

Table 1 shows the snow reports taken from the BBC online website (http://www.bbc.co.uk/weather/sports/features/skiing_text.shtml) on the 6$^{th}$ March 2001. The description for Scotland was excluded from the analysis as both the presentation and information contained within the report were judged to be very different to those used for the other countries.

TABLE 1

Snow reports taken from the BBC online website
(http://www.bbc.co.uk/weather/sports/features/skiing_text.shtml)
on Mar. 6, 2001.

| | |
|---|---|
| AUSTRIA | The temperature in Austria has risen over the weekend and this is effecting the lower slopes of some of the resorts. Kitzbuhel's (25 cm/115 cm) runs to resort are slushy and worn although the upper area is still offering some good skiing. Rain on Sunday in Soll (50 cm/150 cm) has made the snow a bit wet and heavy, especially on the lower runs. There is some excellent skiing still to be found in Austria with St Anton (75 cm/320 cm) offering powder off piste and Obergurgl (60 cm/240 cm) giving great piste skiing/boarding opportunities. |
| FRANCE | Many off the French resorts had high temperatures over the weekend giving slushy or heavy snow. The avalanche risk in many resorts has also increased to 'high' or above. Snow was falling on the slopes of Flaine (60 cm/320 cm) over the weekend but this turned to sleet and rain at resort level. La Plagne (115 cm/215 cm) also had snow but it was very wet and the lower slopes are described as 'slushy'. Les Arcs (85 cm/260 cm) and Alpe D'Huez (78 cm/220 cm) are also in a similar state, offering good skiing in the upper areas but with wet snow lower down. |
| SWITZERLAND | Along with the rest of Europe Switzerland experienced warm temperatures over the weekend. The snow is still in pretty good condition in most the resorts and temperatures are falling today. Verbier (70 cm/180 cm) was unable to open many of its lifts on Sunday due to bad weather but once this clears the resort will be offering good skiing throughout. Davos (95 cm/180 cm) had its full uplift open during the weekend and it's pistes are in great condition. |
| ITALY | Italy had some snow over the weekend and conditions on the whole remain good. Cervinia (120 cm/300 cm) had 20 cms of snow over the weekend and the conditions both on and off piste are excellent. Madonna di Campiglio (85 cm/240 cm) unfortunately had rain below 1750 m and this has made the lower slopes quite wet, but there is still good skiing above this height. |
| ANDORRA | Rain over the weekend has left most the resorts with wet and slushy slopes. Soldeu (50 cm/110 cm) also suffered from high winds yesterday only allowing it to open 8 lifts. Today it is sunny but more snow is needed to repair the damaged slopes. |
| NORWAY/ SWEDEN | Some strong winds and snowfall over the weekend have given variable conditions in this area. Geilo (115 cm/130 cm) had blizzard conditions on Sunday but the skiing should be great once the storm finishes. Temperatures on the whole have risen but are still below zero. |
| GERMANY | Some of the German resorts received snow over the weekend and this has improved conditions. Oberstdorf (20 cm/235 cm) has all its lifts open and snow is falling there today. Reit im Winkl (50 cm/180 cm) also has all lifts open and is offering great skiing. Snow is expected for most of Germany this week. |
| BULGARIA | Bulgaria has had warm temperatures and what snow there was is suffering. Borovets (20 cm/50 cm) has rocks showing through on some of it's pistes. All the resorts need snow very soon, at present there doesn't seem to be any on the way. |
| SCOTLAND | The Foot and Mouth situation is being monitored by all the Scottish resorts at present and all are discouraging skiers, boarders, ski tourers, hill walkers and climbers not to leave the ski area boundries. Nevis Range, as of Feb. 03, 2001 has stopped climbers and hill walkers from accessing Aonach Mor. NEVIS RANGE—There are 6 lifts open today in the Nevis Range today and the skiing is good in all areas. There have been moderate amounts of fresh snow but due to a slight thaw the lower slopes have wet snow. CAIRNGORM—Unfortunately due to blizzard conditions there are only 2 lifts open today. Fresh |

TABLE 1-continued

Snow reports taken from the BBC online website
(http://www.bbc.co.uk/weather/sports/features/skiing_text.shtml)
on Mar. 6, 2001.

|  | |
|---|---|
| | snow is falling and when the storm stops conditions should be excellent.<br>GLENCOE—All lifts are open and the conditions are very good. There are some icy patches but these are few and far between. The cover on the whole is fresh snow on a hard base.<br>GLENSHEE—The majority of the uplift is operational today and the slopes have a complete cover of groomed, firm packed snow. The resort is reading itself for the Braemar Telemark Festival starting on Sep. 03, 2001.<br>THE LECHT—All the main runs are complete with new snow on a firm base, there is also ample nursery area open. The skiing is very good throughout resort, with the Buzzard and Eagle runs offering some of the best snow. |
| AMERICA | Conditions throughout America are still very good and some resorts received a small top-up of the white stuff this weekend. Mammoth (240 cm/270 cm) has excellent conditions both on and off piste. Arapahoe Basin (130 cm/135 cm) has great powder off piste and lovely groomed slopes, but with minus 16° Celsius, the resort is a bit chilly. Beaver Creek (142 cm/144 cm) has all its lifts open and the skiing/boarding is great. |
| CANADA | There has been very little change to the Canadian resorts over the weekend. Most resorts are still offering good skiing. Red Mountain's (74 cm/126 cm) slopes are in great condition but more snow is needed to fully open up the off piste. Jasper (63 cm/155 cm) has some good off piste and all its lifts open. In general although conditions are good in most resorts more snow would be welcomed by all of them. |

These data from table 1 were separated into linguistic units of words (groups of characters separated by white spaces or punctuation) and stop words were removed using a standard list (which in this case was taken from the webpage: http://www-fog.bio.unipd.it/waishelp/stoplist.html).

These were formed into a words-country frequency matrix showing the number of times each word was used in describing the conditions present within each country. A subset of this matrix (as an example, whole matrix is too big to display) is shown in Table 2.

TABLE 2

Submatrix of the Words-Country frequency matrix.

| | Country | | | | |
|---|---|---|---|---|---|
| word | America | Andorra | Austria | Bulgaria | Canada |
| AREA | 0 | 0 | 1 | 0 | 0 |
| BIT | 1 | 0 | 1 | 0 | 0 |
| BOARDING | 1 | 0 | 1 | 0 | 0 |
| CONDITION | 0 | 0 | 0 | 0 | 1 |
| CONDITIONS | 2 | 0 | 0 | 0 | 1 |
| EXCELLENT | 1 | 0 | 1 | 0 | 0 |
| FALLING | 0 | 0 | 0 | 0 | 0 |
| GOOD | 1 | 0 | 1 | 0 | 3 |
| GREAT | 2 | 0 | 1 | 0 | 1 |
| HEAVY | 0 | 0 | 1 | 0 | 0 |

The dimension reduction technique, correspondence analysis (as described in Greenacre (1984) Theory and Applications Of Correspondence Analysis, London: Academic Press) was then applied to this frequency matrix and the scores for the first two dimensions extracted for both the countries and words.

FIG. 1 shows a plot of the scores of the words and countries on the first two dimensions. Countries who are experiencing similar conditions and who have similar language used to describe their conditions will have similar scores from the correspondence analysis and so will be plotted close together in this map. The words strongly associated with the conditions present in a particular country or group of countries will also be plotted close to these countries. For example France and Andorra are plotted close to each other on the correspondence analysis map suggesting that the conditions in both of these countries are similar. Similarly Germany and Canada are grouped together. The conditions in France and Andorra are characterised by words such as "wet" and "slushy", whilst the conditions in America are characterised by words such as "powder", "excellent" and "great". The position of Bulgaria on the map suggest that it is experiencing very different conditions from the other countries, this difference in conditions being characterised by the word "warm".

Figure 2:
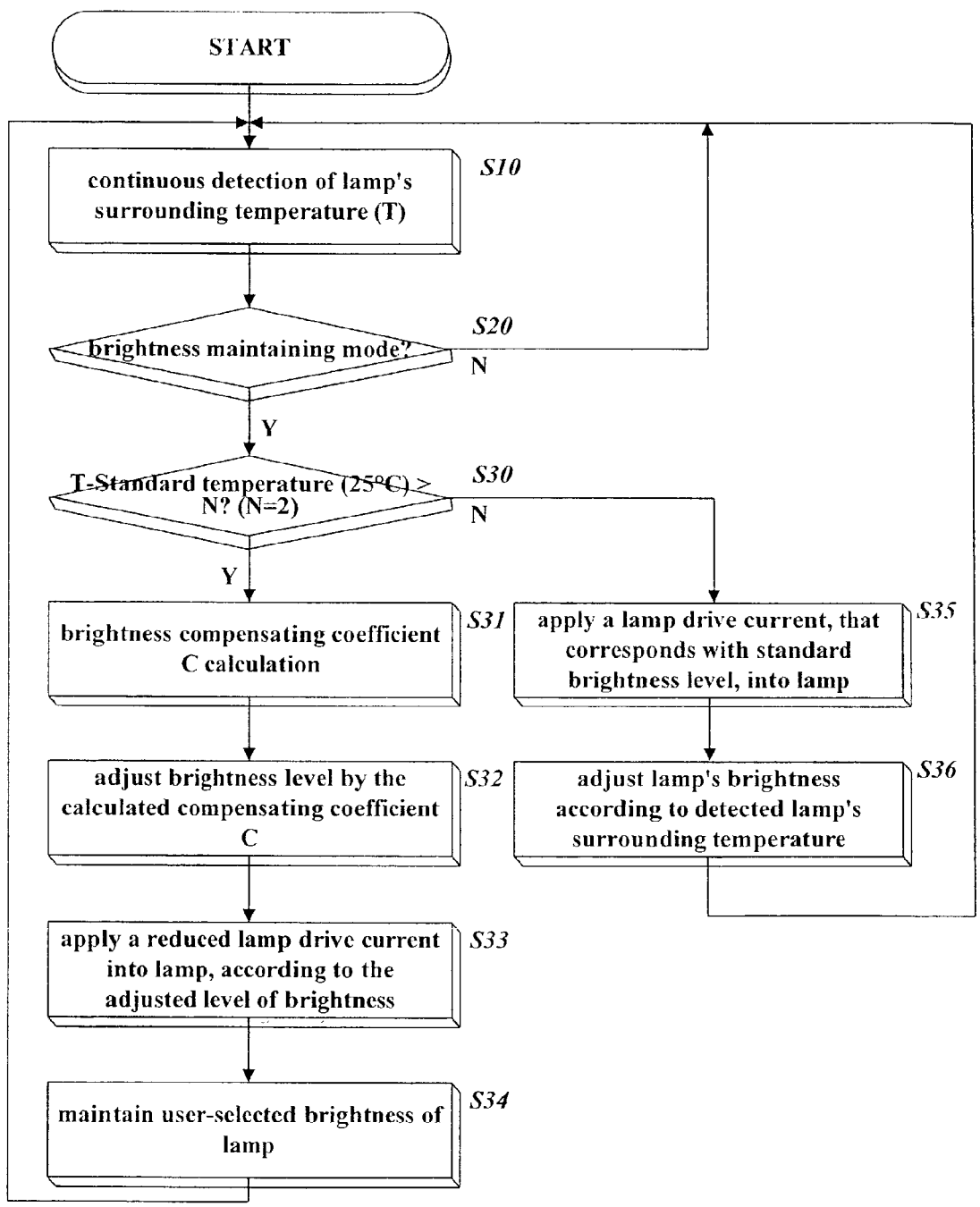

These results can also be related to other sources of data. For example, the snow reports also contains measures of the depth of snow. If we take an average of these values for each country as a measure of the average depth of snow present in resorts in that country then we can relate this data to the output from the textual analysis. FIG. 2 shows a clear statistically significant correlation (p=0.724, n=10, p=0.018) between the first dimension from the correspondence analysis and the average snow depth. This suggests that the differences in the language used to describe the snow conditions in different countries extracted by on the first correspondence analysis dimension is strongly related to the depth of snow present in the different countries.

The results from the correspondence analysis may alternatively be related to other measures such as temperature or altitude. If a series of reports were collected over time, time series modelling techniques may be used. Alternatively, given other relevant information, model building approaches to develop predictive models may be used, for example to be able to model visitor satisfaction or resort income with the resort as a function of the language used in the snow condition reports.

Example 2

An alternative embodiment is illustrated below using the same data set as in Example 1 (table 1). The data is subjected to the same linguistic analysis as in the previous embodiment. Distances between countries were then calculated using Jaccard coefficients, i.e. for each pair of countries the fraction of the words used in the description of conditions for either country which were used in the description of the conditions in both companies were calculated. This gave a similarity matrix shown in table 3: each pair of countries has a measure of similarity between 0 and 1, where a similarity of 0 would mean that the reports from the two countries have no words in common and a similarity of 1 would mean that the sets of words used in the reports for the two countries were identical. This was then subjected to a cluster analysis using Ward's method (SAS/STAT User's Guide, 1990). Choosing a four cluster solution gave us clusters of countries {America, Canada, Germany, Switzerland}, {Andorra, Austria, France, Italy}, {Norway} and {Bulgaria}.

These clusters identify countries experiencing similar snow conditions reflected in the use of similar language in their snow reports. An idea of the conditions represented by each of these clusters can be obtained by observing the words used in the descriptions of the conditions of the countries in the cluster which are used infrequently elsewhere. For example, the words "lift", "great" and "open" are used in all of the reports in the countries {America, Canada, Germany, Switzerland} cluster but only once or twice elsewhere, the conditions in the countries in this cluster are characterised by good skiing conditions. The words "rain" and "wet" are used in all of the reports in the {Andorra, Austria, France, Italy} cluster but not in any other reports, characterising the conditions in these countries as being spoiled by rainy conditions.

TABLE 3

Similarity matrix of language usage between snow reports of different countries.

| COUNTRY | AM | AN | AUS | BUL | CAN | FRA | GER | IT | NOR | SZ |
|---|---|---|---|---|---|---|---|---|---|---|
| AMERICA | 1.00 | 0.21 | 0.44 | 0.05 | 0.50 | 0.22 | 0.40 | 0.35 | 0.18 | 0.31 |
| ANDORRA | 0.21 | 1.00 | 0.24 | 0.13 | 0.35 | 0.36 | 0.32 | 0.26 | 0.10 | 0.24 |
| AUSTRIA | 0.44 | 0.24 | 1.00 | 0.08 | 0.32 | 0.54 | 0.21 | 0.42 | 0.22 | 0.28 |
| BULGARIA | 0.05 | 0.13 | 0.08 | 1.00 | 0.12 | 0.16 | 0.13 | 0.07 | 0.07 | 0.28 |
| CANADA | 0.50 | 0.35 | 0.32 | 0.12 | 1.00 | 0.29 | 0.53 | 0.39 | 0.20 | 0.45 |
| FRANCE | 0.22 | 0.36 | 0.54 | 0.16 | 0.29 | 1.00 | 0.26 | 0.40 | 0.13 | 0.35 |
| GERMANY | 0.40 | 0.32 | 0.21 | 0.13 | 0.53 | 0.26 | 1.00 | 0.21 | 0.22 | 0.50 |
| ITALY | 0.35 | 0.26 | 0.42 | 0.07 | 0.39 | 0.40 | 0.21 | 1.00 | 0.17 | 0.16 |
| NORWAY | 0.18 | 0.10 | 0.22 | 0.07 | 0.20 | 0.13 | 0.22 | 0.17 | 1.00 | 0.27 |
| SWITZERLAND | 0.31 | 0.24 | 0.28 | 0.28 | 0.45 | 0.35 | 0.50 | 0.16 | 0.27 | 1.00 |

What is claimed is:

1. A method of driving a lamp for an LCD of a portable computer, comprising:
   setting a default brightness in the LCD that corresponds to a prescribed value stored in the portable computer;
   checking a surrounding temperature of the LCD;
   selecting one of a first mode and a second mode for operating the lamp, wherein operating the lamp is the first mode comprises,
      receiving a user selected one of plurality of brightness control levels to set a first brightness and determining a corresponding first drive current as a drive current for the lamp,
      maintaining the first brightness within a first temperature range while the drive current varies to reduce lamp power consumption,
      determining a corresponding drive current at a minimum temperature of the first temperature range as a second drive current for a second temperature range that is below the first temperature range, and
      maintaining the second drive current while the temperature of the lamp is within the second temperature range to reduce the lamp power consumption, and
   wherein the operating the lamp in the second mode comprises,
      determining a third drive current that corresponds to the default brightness,
      maintaining the third drive current within a third temperature range while the brightness changes,
      determining a corresponding brightness level at a minimum temperature of the third temperature range to set a fourth brightness for a fourth temperature range that is below the third temperature range, and
      maintaining the fourth brightness while the temperature of the lamp is within the fourth temperature range while the drive current changes.

2. The method of claim 1, wherein said one of the first and second modes is determined by a user action at the portable computer.

3. The method of claim 2, wherein the first mode is a power saving mode, and wherein in the second temperature range the brightness changes.

4. The method of claim 1, wherein the first and third temperature ranges are equal, and wherein the second and fourth temperature ranges are equal.

5. The method of claim 1, wherein the first mode is a brightness maintaining mode.

6. The method of claim 1, wherein the first mode and the second mode for operating the lamp occur during normal operations.

7. The method of claim 1, wherein the first mode and the second mode for operating the lamp occur after initialization.

8. The method of claim 1, wherein the first mode and the second mode for operating the lamp operate after lamp ignition.

9. The method of claim 1, wherein the first mode and the second mode for operating the lamp occur regardless of a time since initialization.

10. The method of claim 9, wherein the first and second modes are performed more than two minutes from when an inverter for driving the lamp is enabled.

11. A lamp drive method of a portable computer, comprising:
   selecting a standard temperature of a lamp driving an LCD;
   selecting a brightness control level of a plurality of brightness control levels that determines a corresponding brightness in the LCD according to the standard temperature;
   detecting surrounding temperature of the lamp;
   selecting one of a first mode and a second mode for operating the lamp, wherein operating the lamp in the first mode comprises,
      reducing a drive current that is to be applied into the lamp to maintain the corresponding brightness within the plurality of brightness control levels in accordance with a change in the detected surrounding temperature of a lamp, and wherein operating the lamp in the second mode comprises,
      reducing the brightness of the LCD in accordance with the change in detected surrounding temperature of the lamp to maintain a corresponding drive current of the selected brightness control level, and wherein the corresponding drive current is determined at a minimum temperature of a first temperature range of the first mode and maintained while the temperature of the lamp is within a second temperature range that is below the first temperature range in the second mode.

12. The method of claim 11, wherein the first and second modes for operating the lamp occur during normal operations.

13. The method of claim 11, wherein the first and second modes for operating the lamp occur after initialization.

* * * * *